United States Patent
Arora et al.

(10) Patent No.: US 9,450,823 B2
(45) Date of Patent: Sep. 20, 2016

(54) HYBRID NETWORK MANAGEMENT

(71) Applicant: NEC Laboratories America, Inc., Princeton, NJ (US)

(72) Inventors: Nipun Arora, Plainsboro, NJ (US); Hui Zhang, Princeton Junction, NJ (US); Cristian Lumezanu, East Windsor, NJ (US); Junghwan Rhee, Princeton, NJ (US); Guofei Jiang, Princeton, NJ (US); Hui Lu, West Lafayette, IN (US)

(73) Assignee: NEC Corporation (JP)

( * ) Notice: Subject to any disclaimer, the term of this patent is extended or adjusted under 35 U.S.C. 154(b) by 65 days.

(21) Appl. No.: 14/453,054

(22) Filed: Aug. 6, 2014

(65) Prior Publication Data

US 2015/0043382 A1 Feb. 12, 2015

Related U.S. Application Data

(60) Provisional application No. 61/864,077, filed on Aug. 9, 2013.

(51) Int. Cl.
*H04L 12/24* (2006.01)
*H04L 12/46* (2006.01)

(52) U.S. Cl.
CPC .......... *H04L 41/082* (2013.01); *H04L 12/4675* (2013.01); *H04L 41/0803* (2013.01); *H04L 41/12* (2013.01); *H04L 41/20* (2013.01)

(58) Field of Classification Search
None
See application file for complete search history.

(56) References Cited

U.S. PATENT DOCUMENTS

| | | | |
|---|---|---|---|
| 2013/0103817 A1* | 4/2013 | Koponen | G06F 9/45558 709/223 |
| 2014/0050223 A1* | 2/2014 | Foo | H04L 47/2441 370/400 |
| 2014/0149542 A1* | 5/2014 | Luo | H04L 45/02 709/217 |
| 2014/0280817 A1* | 9/2014 | Uppalapati | H04L 41/044 709/223 |

OTHER PUBLICATIONS

Casado, M., et al. "Fabric: A Retrospective on Evolving SDN" HotSDN'12. Aug. 2012. pp. 85-89.
Levin, D., et al. "Toward Transitional SDN Deployment in Enterprise Networks" Open Networking Summit. Apr. 2013. (2 Pages).
"Software Defined Networking" <http://en.wikipedia.org/wiki/Software-defined_networking> Jul. 2014. (10 Pages).
"Sliceable Switch App" <https://github.com/trema/apps/wiki/sliceable_switch_tutorial>Jul. 2014. (26 Pages).

(Continued)

*Primary Examiner* — Charles C Jiang
*Assistant Examiner* — George Atkins, Jr.
(74) *Attorney, Agent, or Firm* — Joseph Kolodka (57) ABSTRACT

Method and systems for controlling a hybrid network having software-defined network (SDN) switches and legacy switches include initializing a hybrid network topology by retrieving information on a physical and virtual infrastructure of the hybrid network; generating a path between two nodes on the hybrid network based on the physical and virtual infrastructure of the hybrid network; generating a virtual local area network by issuing remote procedure call instructions to legacy switches in accordance with a network configuration request; and generating an SDN network slice by issuing SDN commands to SDN switches in accordance with the network configuration request.

9 Claims, 2 Drawing Sheets (56) References Cited

OTHER PUBLICATIONS

"Virtual LAN" <http://en.wikipedia.org/wiki/Virtual_LAN> Jul. 2014. (8 Pages).

"Remote Procedure Call" <http://en.wikipedia.org/wiki/Remote_procedure_call> Jul. 2014.(5 Pages).
"Openflow" <http://en.wikipedia.org/wiki/OpenFlow>Jul. 2014. (4 Pages).
"Trema" <http:trema.github.io/trema/> Jul. 2014. (3 Pages).

* cited by examiner

HYBRID NETWORK MANAGEMENT

RELATED APPLICATION INFORMATION

This application claims priority to provisional application No. 61/864,077 filed Aug. 9, 2013, the contents thereof are incorporated herein by reference

BACKGROUND OF THE INVENTION

Network management has always been a big challenge in large-scale enterprise and datacenter environments. The network must operate reliably and provide high-performance connectivity while ensuring organizational policy management. This problem is further compounded by provisioning high-level guarantees such as network isolation across complex network boundaries and decoupling logical and physical network using network virtualization schemes.

Software-Defined Networking (SDN) is a potential solution, providing great flexibility for fine-grained data plane control. Most existing work has provided network management solutions for a full deployment of SDN switches or a pure legacy switch deployment. However, monetary or practical constraints have made "hybrid networks" a reality. The term "hybrid networks" refers to systems, which are partially deployed using SDN switches and partially using legacy switches.

Most existing solutions do not provide a management mechanism that can handle network management of hybrid systems. While hybrid topologies have been suggested, no adequate management solution exists. Additionally, while pure legacy network management and pure SDN management are well-studied fields, existing SDN controllers and legacy switch management mechanisms cannot be directly applied to hybrid network systems, as they will be unable to manage the legacy part of the system.

BRIEF SUMMARY OF THE INVENTION

A hybrid network controller that controls a network that has software-defined network (SDN) switches and legacy switches includes a user interface configured to display network information and to receive high-level network management commands; an SDN controller configured to communicate with the SDN switches to update and manage the SDN switches; a remote procedure call (RPC) manager configured to communicate with the legacy switches to update configuration and rules in the legacy switches; and a hybrid manager configured to a route between two communicating nodes in the network based on a network topology, to calculate legacy switches and SDN switches in the route to update, and to create a connection and network isolation using the RPC manager and SDN switch configuration.

A method for controlling a hybrid network having software-defined network (SDN) switches and legacy switches include initializing a hybrid network topology by retrieving information on a physical and virtual infrastructure of the hybrid network; generating a path between two nodes on the hybrid network based on the physical and virtual infrastructure of the hybrid network; generating a virtual local area network by issuing remote procedure call instructions to legacy switches in accordance with a network configuration request; and generating an SDN network slice by issuing SDN commands to SDN switches in accordance with the network configuration request.

These and other advantages of the invention will be apparent to those of ordinary skill in the art by reference to the following detailed description and the accompanying drawings.

DETAILED DESCRIPTION

Embodiments of the present invention provide the design of a novel controller called "HybNET", which leverages both software defined networking (SDN) and legacy network management to provide management interface, which is compatible with both SDN and legacy switches. The present embodiments employ the concept of "virtualization in virtualization," which provides an overarching virtualized abstraction while virtualizing the intermediate connections using legacy switch as virtual links. In a virtualization in virtualization scheme, a virtual local area network (VLAN) is encapsulated inside an SDN slice. This provides the ability to manage the legacy part of the hybrid network using VLAN techniques, while the SDN slice sees the legacy part as a single virtual link, creating a slice that includes that virtual link between two switches. This makes the entire network virtualizable.

This also provides for network isolation in the virtual links. Network isolation forms the core-basis of network virtualization as it isolates the traffic of one virtual network from other virtual networks. This allows network operators to provide an isolated view of the virtual network and apply operations with affecting other parts of the network. Isolation in virtual links is provided using virtual local area networking (VLAN) or other similar legacy network isolation techniques. Further, the present embodiments provide a centralized mechanism to automate the control and management of common network tasks (such as addition, deletion of Virtual networks, rule/flow updates, etc.).

The present embodiments provide compatibility between heterogeneous network management schemes. In particular, they provide network virtualization with a novel toolset, which allows compatibility between existing network management mechanisms (using remote procedure calls (RPC) for legacy switches and controllers in SDN switches) so as to provide a network control and management tool for a "hybrid system."

Figure 1:
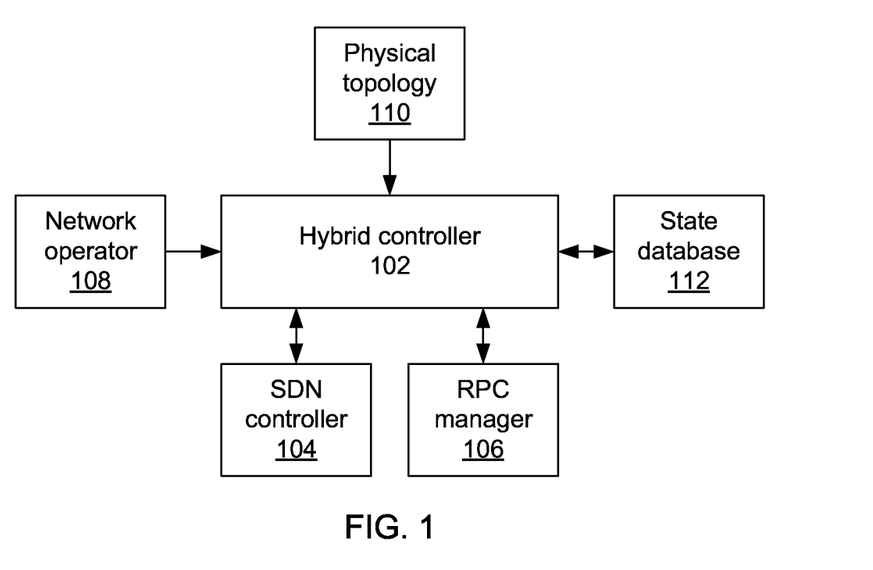
FIG. 1 is a diagram of a hybrid network architecture in accordance with the present principles.

Referring now to FIG. 1, an overview of a HybNet architecture is shown. A hybrid controller 102 provides a communication mechanism between SDN controller 104 and the hybrid network. The hybrid controller 102 allows the network operator 108 to send input and uses RPC calls to manage legacy network 106.

The SDN controller 104 allows network operators 108 to update flows and visualize and manage the network in SDN-enabled switches. The hybrid controller 102 communicates to the SDN controller 104 and commands it to update and manage the SDN portion of the network. For the legacy controller 106, there are several mechanisms which may be used to manage legacy switches. In the present embodiments it is specifically envisioned that a simple RPC module may be used which accepts inputs and communicates with the hybrid controller 102 to manage legacy switches.

The network operator 108 interacts with an interface module to view and manage the hybrid network. This allows the network operator 104 to handle higher-level intelligent tasks without worrying about the underlying technology to manage the physical topology 110. The physical topology 110 can be described explicitly by the network operator 108 or can be discovered by the hybrid controller 102 using network protocols such as the link layer discovery protocol, but there may be technical constraints depending on the infrastructure.

The hybrid controller 102 maintains the state of the entire network in a database 112 and updates the database 112 whenever any changes are made. The database 112 can also be used for persistent state management whenever the controller 102 is shut down. When the controller 102 is brought back up, the previous state can be retrieved in an initialization phase.

Figure 2:
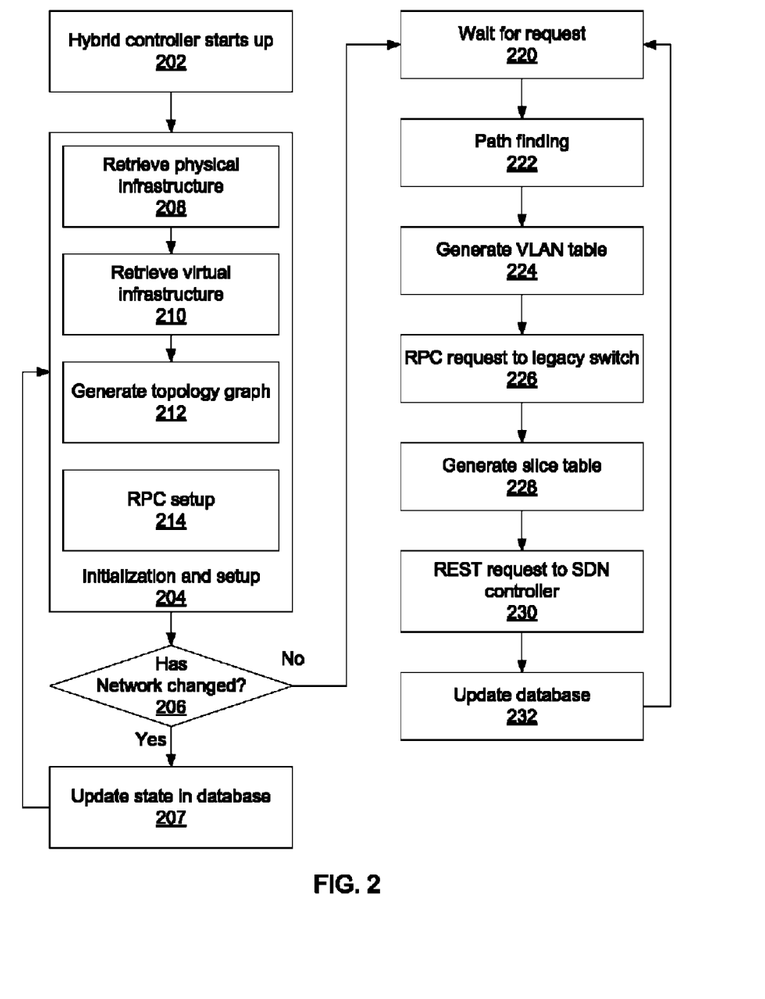
FIG. 2 is a block/flow diagram of a method for controlling a hybrid network in accordance with the present principles.

Referring now to FIG. 2, a method of hybrid network management is shown. Block 202 starts up the hybrid controller 102. If the hybrid controller 102 is a discrete hardware device, then this may represent powering the device on. Block 204 initializes the hybrid controller 102. The first step of initialization is to retrieve the physical topology of the network in block 208, whether by direct input from the network operator 104 or by automatic discovery in the hybrid controller 102. Block 210 then retrieves the virtual infrastructure by, e.g., requesting the infrastructure information from database 112. Block 210 recreates a mapping between the virtual/logical network and the physical network. Block 212 then generates a topology graph for the virtual topology following virtualization in virtualization. Block 214 performs setup of legacy components. For example, this may include legacy switch setup, which sets up trunk mode for all concerned ports and configures a management isolated VLAN.

To ensure that a clean state of the hybrid system is maintained, block 206 determines whether there is any change in the physical network topology. If there is a change, block 207 updates the state in the database 112 and processing returns to block 204.

At block 220, the hybrid controller 102 takes input from a user, e.g., the network operator 108. This input represents some network management task. For example, the network operator 108 may request that the hybrid controller 102 add a virtual network. Block 222 then generates the shortest path between two communicating nodes on the virtual machine and determines which legacy switches need to be updated. The legacy switches act as virtual links and are updated by the hybrid controller 102. The hybrid controller 102 is programmed to manage the SDN fabric, assuming the whole network to be SDN.

Virtualization guarantees are updated by updating the VLAN table in each legacy switch and by using a sliceable switch application in SDN switches. A network ID is used to create a slice in the hybrid network, and each network ID maps to a VLAN legacy switch and an SDN slice. Block 224 generates the VLAN table, which includes using RPC requests in block 226 to update the legacy switches in advance by updating their VLAN tables. Update failures in any switch are recorded as a failure to generate the slice and all updates up to that point are rolled back. Block 228 generates the slice table, which includes configuring network slices using a sliceable switch app in the controller and updating the network slices when in-packed messages are received by the SDN controller in block 230.

Block 232 then updates the 112 database each time an update to the network has been successfully committed. Any partial failures are not committed and the system state is rolled back to the original. Processing returns to block 220 to wait for the next request.

In large networks, cloud providers apply network isolation at layer 2 to guarantee user security and facilitate traffic management. For legacy switches, this may be accomplished by assigning a VLAN-ID to each user. For SDN switches, a sliceable switch application provides isolation guarantees. The hybrid controller 102 has a global view of the physical topology 110. However, an SDN view network topology is provided to the SDN controller, while the legacy switches connecting SDN switches are interpreted as virtual links. The management of virtual links by the hybrid controller 102 ensures compatibility between SDN and the VLAN.

Network intelligence tasks are therefore left to the SDN switches, while the legacy switches are limited to the task of packet transport (although such legacy switches may still have isolation capability). This ensures that the hybrid network retains some of the advantages and programmable flexibility of the SDN controllers 104. The hybrid controller 102 acts as an interface, which can also provide some measure of control over the virtual links to ensure isolation using layer-2 VLAN mechanisms configured via RPC calls.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

APPENDIX

HybNET

Network Manager for a Hybrid Network Infrastructure

Abstract

The emergence of Software-Defined Networking (SDN) has led to a paradigm shift in network management. SDN has the capability to provide clear and easy management of complex operational challenges in large scale networks. However, most of the existing work in SDN network management assumes a full deployment of SDN enabled network switches. Due to both practical and financial limitation real implementations are likely to transition through a partial deployment. In this paper, we describe our experience in the design of HybNET a framework for automated network management of a hybrid network infrastructure (both SDN and legacy network infrastructure). We discuss some of the challenges we encountered, and provide a best-effort solution in providing compatibility between legacy and SDN switches while retaining some of the advantages and flexibility of SDN enabled switches. We have tested our tool on small hybrid network infrastructure, and applied it to manage the OpenStack Neutron interface a well-known open-source IaaS provider.

1. Introduction

Software-defined networking (SDN) enables efficient and expressive network management in enterprises and data centers by (1) separating the high-level network policy specification (e.g., for isolation, security, failure recovery) from its low-level implementation on network devices (e.g., forwarding rules), and (2) allowing fine-grained visibility and almost instant configuration updates of the network. Network operators realize SDN by deploying switches whose forwarding table is programmable remotely from a logically centralized controller using a specialized protocol (e.g., OpenFlow [22]).

The majority of OpenFlow-enabled networks deployed in practice, either in academic test-beds [20, 16, 14, 23] or part of large data centers [19, 17], assume a fully evolved SDN ecosystem, where all legacy network configuration has migrated to OpenFlow. In reality, however, the transition from the legacy network to an OpenFlow-enabled network does not happen overnight.

Due to both practical and financial limitations the network is likely to transition through a hybrid deployment with both legacy and OpenFlow switches and with the same high-level policy implemented through different low-level mechanisms. For example, ensuring communication isolation among a set of hosts is likely implemented with VLANs on legacy switches and fine-grained forwarding rules on OpenFlow switches. The challenge, identified by others as well [22, 21, 15] is to ensure seamless network operation, even when the configuration mechanisms of the network or not compatible.

We present HybNET, a network management framework for hybrid OpenFlow-legacy networks. HybNET provides the network operator centralized control and visualization across the whole network, similar to how a controller in a pure OpenFlow network would. HybNET hides the dissonance between the SDN and legacy network configurations by transparently translating the legacy network configuration into OpenFlow configuration and providing a common configuration mechanism for both SDN and legacy switch configuration. In essence, our framework views the connections between OpenFlow switches as virtual links composed by multiple links between physical switches. Thus, OpenFlow switches deal with the task of intelligently applying the configuration, while legacy switches are limited to providing forwarding.

The contribution of this paper is two-fold. Firstly, we provide a basic design of a hybrid network manager which allows for seamless connectivity in the network via a common centralized configuration interface. Secondly, we provide a mechanism for network virtualization functionality for a set of hosts. This functionality is provided using VLANs in traditional networks and using fine-grained forwarding rules inserted by the OpenFlow controller. HybNET provides a proxy service that translates the VLAN configuration into OpenFlow rules on the fly by.

We have implemented the automation management prototype on top of the popular open source cloud computing platform, OpenStack [8]. We adopt Neutron [3], the network service of OpenStack, for host-side network virtualization and construct the hybrid physical infrastructure by using legacy switches as well as SDN switches (supporting OpenFlow). The cloud infrastructure was hosted a mini-network infrastructure, with both SDN and legacy switches. HybNET was successfully able to manage, add, delete and modify virtual tenant networks for users and network operators, and provided network isolation for all tenants. We believe that HybNET is the first of it's kind in providing a practical management mechanism for hybrid networks, and can be easily used by network operators without any special hardware requirements.

The rest of the paper is organized as follows: Section 2 introduces the design of HybNET. Section 3 describes implementation of our prototype. Section 4 shows the evaluation in terms of infrastructure performance. Section 5 discusses the related work. Finally, in section 6, we summarize the work.

2. Design

2.1 Architecture Overview

Our design consists primarily of three components: physical infrastructure, path finder, and controller (described in section 2.2). The physical infrastructure describes the basic mechanism that HybNET connects to the network infrastructure, and the pathfinder provides a basic algorithms to find viable paths in the network for connectivity. The main component, and workflow is a part of the controller which manages and orchestrates the entire management framework.

Each network operator request is dealt as a transaction and is logically atomic in nature. HybNET checks if the rules have been updated successfully, and reports any errors while maintaining state consistency at all times. Additionally, HybNET supplies a common API for network operators to use to process transactions. For each transaction, configurations are prepared and sent to legacy switches or SDN controllers through remote communication mechanism, such as RPC and REST calls, and a persistent state view is kept in the mapping database.

2.2 Components

Physical Infrastructure/Topology:

A Hybrid Network is composed of both legacy and SDN switches, which can be fabricated into various topologies based on requirements [15, 21]. However, to provide a generic framework, HybNET does not assume any underlying topology. At the same time, we assume that we require complete knowledge of the physical topology, which can be provided either by the network administrator or by an automatic network discovery service (e.g. Link Layer Discovery Protocol (LLDP)[2]).

Additionally, similar to OpenFlow controllers HybNET requires management access to control every switch in the network. Access can be implemented either in-band (management traffic share the network with data traffic) or out-band (management traffic is designated to separate physical network). All network requests are communicated to the HybNET controller, which computes the network operations and segregates the updates that need to be performed in the legacy part of the network and the OpenFlow part of the network. The resulting changes are then disseminated to the OpenFlow controller (which then manages all SDN switches), and the relevant legacy switches. HybNET talks to OpenFlow controller via REST calls and subsequently the controller manages OpenFlow switches via OpenFlow protocols. While the management of the OpenFlow controller is standardized, legacy switches have several network management mechanisms, such as SNMP[9] and NETCONF[18]. For the purposes of this paper, we have demonstrated our proof of concept tool by using the NET- CONF protocol (we believe that other mechanisms can also be adapted to such a management framework).

Provided aforementioned communication protocols, HybNET will be able to control every switch in hybrid network.

Path Finder:

As stated earlier the primary goal of any network management solution is to provide end-to-end connectivity. To this end, HybNET offers path finding algorithms to calculate suitable paths to connect end-hosts whose logical topologies belong to the same network. The present embodiments include a cloud infrastructure which wants to provision two VMs, one is on a first Host and the other is on a second Host on the same logical network and ensure connectivity between them, despite being connected to different legacy switches. Viable paths between them can go through both legacy and SDN switches, hence existing tools cannot be directly applied. The path-finder can find a suitable path by using an appropriate algorithm. Once calculated this path is used to identify the relevant switches that need to be configured, and this information is forwarded to the HybNET controller.

Within enterprise network or data-center networks, network topologies can be much more complex. Thus, intelligent path finding algorithms [12, 13, 24] are required to manage aspects such as efficiency, isolation, load balancing, QoS, etc. However, for the purposes of this paper, our implementation on adopts a simple shortest path algorithm.

Controller:

The controller is the main component of HybNET and manages most of the logic. The workflow of the controller can be divided into two phases: an initialization phase, and a main loop which manages everything at run-time. In the initialization stage, controller retrieves physical topology from the network and generates a topological graph. Additionally, it registers and sets up RPC callback functions so that they can receive and process network operator requests.

The main loop function of controller, manages all run-time network requests. For example, when the user requires to provision a new VM, a logical network is created from the host side. Then an "adding" request with the requisite information is sent to the controller by the network operator with help of HybNET supplied APIs. After receiving this request, controller will parse input parameters to check tenant id, user id, logical network information (i.e., VLAN configurations), and VM information (i.e., host machines). Then path finding algorithm is applied to detect available paths. If the path does not exist, an unreachable error will occur. We mark this transaction as "failed" and send back an error message.

If paths are generated successfully, HybNET prepares configuration files for legacy switches and OpenFlow switches along the path. Our design provides general APIs to allow developers or switch vendors to design drivers to talk to legacy switches or applications, while control of OpenFlow switches is designated to standard OpenFlow controllers. If the return status of each switch after configuration shows SUCCESS, the desired connection is established, otherwise a configuration error will occur. We mark this transaction "failed" and all switches are rolled back to previous configuration state.

Another important aspect is that any changes made to the physical infrastructure need to be reported to HybNET. If physical topology changes, the database is updated correspondingly, and if required the changes are made updating rules on corresponding switches.

2.3 Virtual Links

Network virtualization is the process of combining hardware and software network functionality into a single software-based administrative entity called a virtual network. One of the key features offered by network virtualization is the logical separation of systems physically attached to the same local network into different virtual networks. Grouping hosts with a common set of requirements regardless of their physical location can greatly simplify network design. This enables network operators or infrastructure providers the capability to manage network resources being used by different tenants/applications in isolation.

In legacy network switches, a common way to ensure network isolation and provide virtualization is the use of VLAN tags. VLAN tags can create multiple layer 3 networks by providing layer 2 isolation on the same physical network. When VLAN tagged packets are to simply pass through an intermediate switch via two pass-through ports, only the two ports are a member of the VLAN and are configured to allow tagged packets. The sliceable switch [10] application allows for network isolation in OpenFlow networks, by introducing another level of redirection using the concept of slice. Slice is a software enforced concept, which segregates end-user mac addresses or switch ports in different slices. Before a new flow is created, packet-in frames are sent to the controller. If the packet-in frames belong to the registered slice on that port, the corresponding flow is added to the relevant slice (else it is rejected). A sliceable switch can be used to create a large scale services (theoretically unlimited) within a single domain, unlike VLAN (limited to 4096 tags). It can also create a service that spans multiple domains without considering mesh connectivity between devices. Given these two mainstream isolation methods for traditional network and SDN, the critical problem faced by hybrid network is how to maintain compatibility between them.

In this paper, we propose the idea of "virtualization in virtualization" to allow for network isolation, the first virtualization here refers to SDN slices, and the next to virtualization via VLAN's. As discussed in section 2.2 HybNET has a global view of the physical topology, but offers a SDN-view network topology to the SDN controller. The SDN-view network topology includes the OpenFlow switches connected by "virtual links", which are composed of a succession of legacy switches. This method leaves the network intelligence to the SDN switches, while limiting the primary purpose of legacy switches to packet transport. Isolation can still be applied in virtual links by using VLAN tags, and mapping them to slice-id's.

One of the key limitations in mapping VLAN tags to slice ID's is that VLAN only supports a maximum of 4096 VLAN-ID's, while sliceable switch application does not have any such limitation. Our current solution is simplistic in the sense that we have a one-to-one mapping between VLAN ID and slice ID, this provides a clear abstraction for network virtualization. This solution can work for any hybrid topology, but it is constrained by the range of tags allowed by VLAN and cannot support more than 4096 VLAN's.

Another simplistic mechanism we have tested is to provide network isolation at the OpenFlow layer using sliceable switch and provide no isolation guarantees in the "virtual links" (i.e. VLAN tags are not used in legacy switches, and packets are simply forwarded without any layer 2 isolation). This solution assumes, that either all top-of-the-rack switches are OpenFlow switches, or that each end-host machine has an OpenVSwitch[6] (software OpenFlow switch). Hence, each end-user (VM or end-host) can only be accessed via an OpenFlow enabled switch, which can implement network slices using sliceable switch application thus ensuring isolation. While this solution provides end-user isolation, it does not provide any isolation in the legacy switches, and requires certain restrictions in the physical topology.

2.4 General API

As mentioned earlier, HybNET supplies a common API for network operators to use to process transactions and configure hybrid network infrastructure across boundaries.

For example, say a cloud operator wants to create a new Virtual Tenant Network for company A, and assign some VM's to it. The network operator would first need to add a HybNET slice by calling the function add_slice(slice_id). A successful execution of this function will return a new HybNET slice_id which corresponds an OpenFlow slice and a VLAN tag. Further the operator can add a VM to the given slice by calling the function add_vm_to_slice(tenant_info, ins_info, net_list). As specified, this function requires the information about the owner, VM information (vm id, mac address, host ip etc.), and the slice id generated in the previous call: a successful execution of this function results in HybNET adding the list of VM's to the specified slice. The following are some of the common API functions provided by HybNET.

add_slice(slice_id):
Create a slice in sliceable switch database
@slice_id: unique id for a slice
delete_slice(slice_id):
Delete a slice from sliceable switch database
@slice_id: existing slice_id to be deleted
add_vm_to_slice(tenant_info, ins_info, net_list):
Add a VM to an existing slice and create the network connectivity
@Tenant_info: provides the owner information of this request.
@Ins_info: specifies VM information, such as id, mac, host ip etc.
@Net_list: provides logical topology information including VLAN-ID and Slice-ID.
delete_vm_to_slice(ins_info):
Remove a VM from an existing slice and delete the network connectivity
@Ins_info: specifies VM information.

3. Implementation

In this section, we describe the implementation of HybNET, and it's integration with a well known cloud service provider to test out our system. HybNET has primarily been built in python with the majority of the implementation focused on the controller: this includes the logic to maintain physical and logical topologies in back-end databases, path finding algorithms, and driver interfaces used to communicate with legacy switches and OpenFlow controllers. We also use ruby which is mainly used to manage NETCONF [18] enabled legacy switch configuration.

The prototype of HybNET includes a command line interface which allows administrators to issue network requests. Currently, we have integrated HybNET with OpenStack (Grizzly) an open-source cloud computing platform. Specifically, HybNET works in tandem with Neutron the network service manager of OpenStack to provide hybrid network management capability. Further, in our proof-of-concept implementation each end-host is configured with an OpenvSwitch (OVS) which allows for node level virtualization. The OVS is a software switch based on the OpenFlow protocol, and is connected to HybNET via Neutron. OVS provides node level virtualization by leveraging TAP[1] devices and KVM. All VMs running on the same compute host attach their TAP devices to an OVS integration bridge. Integration bridge isolates attached virtual ports by their logical network tags assigned by network operator and establishes corresponding flow rules for packet forwarding. With the help of OVS, multiple logical networks are able to share one or multiple physical interfaces in an isolated manner. Network requests forwarded to Neutron are intercepted by HybNET as input from the network administrator. Subsequently, HybNET computes and forwards rule updates to Trema[11] OpenFlow controller, and NETCONF based RPCscripts.

[1] further explanation of the exact design can be found at http://docs.openstack.org/trunk/openstacknetwork/admin/content/underthe_hood_open-vswitch.html 4. Evaluation & Case Study In this section, we describe a real world implementation of HybNET in managing a cloud infrastructure. Our testbed consists of compute nodes running on 4-core 3.4 GHz servers and 8 GB memory. Each server contains a number of virtual machines connected to an OVS. The physical network infrastructure consists of Juniper EX2200 series switches (legacy switches) and NEC Programmable-Flow PF5240 switches, which support OpenFlow protocol. We have tested HybNET by integrating it with OpenStack and tested it's feasibility on a mini-network. Additionally, to test performance of HybNET, we simulate a large network environment and check on our frameworks efficiency.

Since HybNET performs no run-time rule update, we believe that it will have no impact in network latency and throughput. The only job performed by HybNET is when configuring the network infrastructure for managing cloud admin, and tenant requests. Hence, we focus on measuring the performance of HybNET only in terms of performing network operations. We adopt Infrastructure Response Time (IRT)[1] (latency between placing and completing a transaction on the network infrastructure) as a key metric to evaluate infrastructure performance. The remainder of this section, discusses the automation and flexibility of HybNET as well as the latency of network administration tasks.

In order to measure overhead, we first connect a real mini-network and beef up the database by simulating input of a much larger fat-tree data-center topology. The advantage of this scheme is that we have a large mock network which increases the complexity substantially, while a real mini-network which can be used to test out the performance and feasibility of HybNET. Our fat-tree is built with k-port switches supporting k3/4 hosts, where k=16 to simulate 320 switches and 1,000+ hosts. The simulated data structures (switches, hosts and interfaces) are stored in the physical infrastructure database, used by hybrid-controller to generate mock physical topology graph at initialization stage. The core switches are OpenFlow switches while the aggregation and edge switches are legacy switches[2].

[2] please note HybNET is topology agnostic hence it does not matter if we use any other topology We simulate such a network topology to measure how long hybrid-controller will take to establish connectivity paths in a real world network environment.

To showcase the feasibility of HybNET we profile VM network provisioning in OpenStack, which we found to be the most time consuming task, and which requires connectivity establishment by our controller. IRT of provisioning a VM can be broken down into the following paths: image template fetching, resource preparation (e.g., virtual network provision, storage provision), connectivity establishment (carried out by hybrid-controller) and VM spawning (VM creation on the host). We configure the network request such that the connectivity path (shortest path from our path-finder) is generated along the real physical switches comprising of both legacy and OpenFlow switches. The OpenStack's compute API (Nova) handles the provision request from an end user within less than 1 seconds, including identification and scheduling tasks. The total VM provision time is about 13.5 seconds (we didn't count the VM booting time), among which 3.5 seconds are for resource preparation and 10 seconds are for VM spawning. Hybrid-controller consumes less than 6 seconds in total. This result is the worst case measurement by choosing the longest possible path in the network (hence it requires configuration of the maximum number of switches). The algorithm takes around 300 milliseconds for calculating shortest path, consisting of 4 legacy switches and 1 OpenFlow switch. Even though legacy switch configuration is parallelized, we found that the configuration of legacy switches was the biggest bottleneck as it takes around 5 seconds to finish setting up new configurations. Unfortunately, this is a limitation of the hardware and it's network configuration capabilities. While not relevant directly, it should also be noted that in the case of OpenStack since the time consumed by hybrid-controller is much smaller than VM spawning, it's latency is hidden from the end-user.

Thus hybrid-controller supplies automation management without obviously influencing original infrastructure provision performance. We believe that HybNET is highly beneficial as it provides complete automation, as well as network virtualization with best-effort performance based on the given physical infrastructure.

5. Related Work

SDN controller frameworks such as Trema[11], NOX[5], and academic projects such as OpenDaylight[7] provide useful mechanisms for network administrators to write controllers and management interfaces to simply the network management process. Trema is an open source framework written in Ruby and C, which provides a rich library to the developer to design a OpenFlow controller. It contains a rich library of existing applications, and a large open-source community contributing updates. NOX is one of the early SDN controllers, developed by Nicira[4] and has since been the basis for many research projects and early exploration in the SDN space. OpenDaylight is a community-led, open, industry-supported framework, for accelerating adoption of SDN in the industry and academia. However, all of these existing mechanisms focus on a full deployment of SDN infrastructure, and cannot be directly applied to a hybrid network.

Recently, Google described B4 [17] it's mechanism to transition from it's pure legacy network infrastructure to an SDN controlled fabric for managing connections between it's data-centers. While an interesting insight into the challenges faced in managing hybrid infrastructures, B4 focuses on network transition specifically for Google's network infrastructure and cannot be generalized. Fabric[15] and Panopticon[21] discuss various topologies that can be used in designing a hybrid network, which can provide some of the high level network functionalities and advantages provided by SDN (such as isolation, access control and load balancing etc.). On the other hand, HybNET istopology agnostic and focuses on providing a framework for management of a hybrid network. In a way, approaches such as Fabric and Panopticon[15, 21]\are complimentary to our goals and showcase some interesting designs which b can be leveraged by HybNET to provide richer network functionalities.

6. Conclusion

In this paper, we provide HybNET a network management framework for providing automation in configuring hybrid networks composed of both legacy and OpenFlow switches. Additionally, our system provides compatibility between VLAN and sliceable switch application to provide seamless network virtualization across boundaries. Our tool aims to retain some of the advantages of SDN networks while making network automation feasible across different network infrastructures. We showcase our system by integrating it with OpenStack a well known open-source cloud service provider, and have tested this tool on a real hybrid network infrastructure to show its feasibility and performance.

The invention claimed is:

1. A hybrid network controller that controls a network comprising having software-defined network (SDN) switches and legacy, non-SDN switches, comprising:
   a user interface configured to display network information and to receive high-level network management commands;
   an SDN controller configured to communicate with the SDN switches to update and manage the SDN switches;
   a remote procedure call (RPC) manager configured to communicate with the legacy switches to update configuration and rules in the legacy switches; and
   a hybrid manager comprising a processor configured to determine a route between two communicating nodes in the network based on a network topology, said route traversing both SDN switches and legacy switches, to calculate legacy switches and SDN switches in the route to update, and to create a connection and network isolation using the RPC manager and SDN controller, wherein network isolation in virtual links is provided using virtual local area networking (VLAN) and wherein the hybrid manager has a global view of a physical topology, an SDN view network topology is provided to the SDN controller, and legacy switches connecting SDN switches are interpreted as virtual links, and the hybrid manager further ensures compatibility between the SDN and the VLAN.

2. The hybrid network of claim 1, wherein the hybrid manager is further configured to provide virtualization in SDN switches using network slices.

3. The hybrid network of claim 1, wherein the hybrid manager is further configured to provide virtualization in legacy switches using virtual local area networks.

4. The hybrid network of claim 1, wherein the hybrid manager is further configured to encapsulate a virtual local area network inside an SDN slice, such that the virtual local area network is implemented on the legacy switches.

5. The hybrid network of claim 4, wherein the hybrid manager is further configured to use each virtual local area network as a virtual link when generating SDN slices.

6. A method of controlling a hybrid network comprising having software-defined network (SDN) switches and legacy, non-SDN switches, comprising:
   initializing a hybrid network topology by retrieving information on a physical and virtual infrastructure of the hybrid network;
   generating a path between two nodes on the hybrid network based on the physical and virtual infrastructure of the hybrid network, said path traversing both SDN switches and legacy switches;

generating a virtual local area network (VLAN) by issuing remote procedure call (RPC) instructions to legacy switches in accordance with a network configuration request; and generating an SDN network slice by issuing SDN commands to SDN switches in accordance with the network configuration request;

wherein network isolation in virtual links is provided using virtual local area networking (VLAN) and wherein the hybrid manager has a global view of a physical topology, an SDN view network topology is provided to the SDN controller, and legacy switches connecting SDN switches are interpreted as virtual links, and the hybrid manager further ensures compatibility between the SDN and the VLAN.

7. The method of claim 6, further comprising encapsulating the VLAN inside the SDN slice.

8. The method of claim 6, wherein the SDN slice uses the VLAN as a virtual link.

9. The method of claim 6, further comprising detecting a change in network topology and reexecuting said step of initializing based on the changed network topology.

* * * * *